United States Patent
Marchesan

(10) Patent No.: US 10,010,027 B2
(45) Date of Patent: Jul. 3, 2018

(54) FEED-BELT FOR A SUGAR-CANE HARVESTER

(71) Applicant: Marchesan Implementos e Maquinas Agricolas Tatu S.A., Matao-SP (BR)

(72) Inventor: Jose Luiz Alberto Marchesan, Matao-SP (BR)

(73) Assignee: Marchesan Implementos e Maquinas Agricolas Tatu S.A., Matao-SP (BR)

( * ) Notice: Subject to any disclaimer, the term of this patent is extended or adjusted under 35 U.S.C. 154(b) by 66 days.

(21) Appl. No.: 14/772,010

(22) PCT Filed: Dec. 4, 2014

(86) PCT No.: PCT/BR2014/050031
§ 371 (c)(1),
(2) Date: Sep. 1, 2015

(87) PCT Pub. No.: WO2015/164935
PCT Pub. Date: Nov. 5, 2015

(65) Prior Publication Data
US 2017/0034998 A1    Feb. 9, 2017

(30) Foreign Application Priority Data

Apr. 28, 2014    (BR) .............. 102014010216

(51) Int. Cl.
*A01D 61/02*    (2006.01)
*A01D 45/10*    (2006.01)
*A01D 61/04*    (2006.01)

(52) U.S. Cl.
CPC .............. *A01D 61/02* (2013.01); *A01D 45/10* (2013.01); *A01D 61/04* (2013.01)

(58) Field of Classification Search
CPC ........ A01D 61/02; A01D 45/10; A01D 61/04; A01D 61/00; A01D 57/22
(Continued)

(56) References Cited

U.S. PATENT DOCUMENTS 1,405,571 A * 2/1922 Davis ............... A01D 61/02
198/692
1,698,670 A * 1/1929 Buquet ............. A01D 45/10
56/13.9
(Continued)

FOREIGN PATENT DOCUMENTS

BR    MU8902265-3 U2    6/2011
EP       1849352 A1 * 10/2007 ............. A01D 61/02
(Continued)

OTHER PUBLICATIONS

International Searching Authority, International Search Report and Written Opinion for International Application No. PCT/BR2014/050031, dated Mar. 25, 2015, 8 pages, European Patent Office, The Netherlands.

*Primary Examiner* — Thomas B Will
*Assistant Examiner* — Joan D Misa
(74) *Attorney, Agent, or Firm* — Alston & Bird LLP

(57) ABSTRACT

One describes a feed-belt (100) for a sugar-cane harvester, comprising first (1) and second (2) belts that substantially overlap each other and define a space for passage of cut cane between them (1, 2), the first and the second belts (1,2) exhibiting a substantially curved profile. The invention has the objective of providing a feed-belt (100) for a sugar-cane harvester that can be used for the processes of both harvesting cane for grinding and harvesting seedlings for plantation, also providing a decrease in the total weight of the machine, lower hydraulic power required for the feed assembly, a smaller number of hydraulic components and lower final cost of the machine, besides simplicity and lower maintenance cost.

12 Claims, 6 Drawing Sheets

(58) Field of Classification Search
USPC .......................................................... 460/114
See application file for complete search history.

(56) References Cited

U.S. PATENT DOCUMENTS

| | | | | |
|---|---|---|---|---|
| 2,122,052 A * | 6/1938 | Bell | ....................... | A01D 61/02 198/604 |
| 2,362,697 A * | 11/1944 | Huddle | .................. | A01D 61/02 198/604 |
| 2,621,461 A * | 12/1952 | Tiedtke | .................. | A01D 45/10 56/15.9 |
| 3,141,281 A * | 7/1964 | Gaunt | ..................... | A01D 45/10 56/14.5 |
| 3,404,686 A * | 10/1968 | Johnson | .................. | A01F 11/06 460/114 |
| 3,456,429 A * | 7/1969 | Sexton, Jr. | ............. | A01D 45/10 56/13.7 |
| 3,460,324 A * | 8/1969 | Tolar | ...................... | A01D 45/10 56/10.7 |
| 3,863,431 A * | 2/1975 | Fowler | ................... | A01D 45/10 56/11.9 |
| 3,942,307 A | 3/1976 | Quick | | |
| 4,065,912 A * | 1/1978 | Quick | .................... | A01D 45/10 56/13.9 |
| 4,098,060 A * | 7/1978 | Quick | .................... | A01D 45/10 56/13.9 |
| 4,121,778 A | 10/1978 | Quick | | |
| 4,129,339 A * | 12/1978 | Quick | .................... | A01D 45/10 209/138 |
| 4,152,883 A * | 5/1979 | Quick | .................... | A01D 45/10 56/13.9 |
| 4,154,047 A * | 5/1979 | Quick | .................... | A01D 45/10 56/13.9 |
| 4,155,602 A * | 5/1979 | Quick | .................... | A01D 45/10 209/139.1 |
| 4,174,718 A * | 11/1979 | van de Weerd | ......... | A01F 12/18 460/114 |
| 4,305,244 A * | 12/1981 | Seymour | ................ | A01F 12/16 209/1 |
| 4,677,813 A | 7/1987 | Stiff et al. | | |
| 5,346,429 A * | 9/1994 | Farley | .................... | A01D 61/04 460/16 |
| 5,463,856 A * | 11/1995 | Beckwith | ............... | A01D 45/10 460/134 |
| 5,478,277 A * | 12/1995 | Kloefkorn | ........... | A01D 61/008 460/114 |
| 6,062,009 A * | 5/2000 | Caillouet | ............... | A01D 45/10 460/100 |
| 6,226,967 B1 * | 5/2001 | Staiger | ................. | A01D 43/077 56/14.5 |
| 7,473,168 B2 * | 1/2009 | Day | ...................... | A01D 61/04 460/16 |
| 8,240,115 B2 | 8/2012 | Marchini | | |

FOREIGN PATENT DOCUMENTS

| | | | | |
|---|---|---|---|---|
| WO | WO-2009095763 A2 * | 8/2009 | ............ | A01D 45/10 |
| WO | WO 2013/003924 A2 | 1/2013 | | |
| WO | WO-2015159464 A1 * | 10/2015 | ............ | A01D 45/10 |
| WO | WO-2015164935 A1 * | 11/2015 | ............ | A01D 45/10 |

* cited by examiner

FEED-BELT FOR A SUGAR-CANE HARVESTER

CROSS REFERENCE TO RELATED APPLICATIONS

This application is a national stage application, filed under 35 U.S.C. § 371, of International Application No. PCT/BR2014/050031, filed Dec. 4, 2014, which claims priority to Brazilian Patent Application No. BR102014010216-7, filed Apr. 28, 2014, the contents of both of which as are hereby incorporated by reference in their entirety.

BACKGROUND

Technical Field

The present invention relates to a double feed-belt having curved profile and metallic frame to be used on sugar-cane harvesters, with application for both harvesting cane intended for grinding, and harvesting seedlings for plantation.

Description of Related Art

The use of feed-belt on sugar-cane harvesters is well known from the prior art.

Patent application MU8902265-3, of the company Santal Equipamentos A.A., describes a harvester provided with continuous conveyor-belts built on a canvas-and-rubber composite with a moveable upper belt floating on the vertical plane and a fixed lower belt, both being provided with the same inclination and linear velocity.

The equipment described in the patent application of the company Santal has a few disadvantages. Both conveyor-belts (upper and lower) are provided with the same inclination (straight and parallel), which renders the entry of the bundle of cane into the assembly, since the cane fed needs to describe a very wide entry angle in a short distance.

The upper and lower belts are provided with the same linear velocity representing a limiting factor for the feeding process for canes of varieties that have a large volume of straw.

Moreover, each belt is built from a continuous canvas-and-rubber composite, which generates the need to have an (upper) pulling roller and a (lower) guiding roller for each belt. This configuration is impaired due to the place where it is used in the machine, since the cane, in whole condition and right after being cut at its base, has much straw, which with the movement is carried and deposited between the continuous material (rubber of the web) and the guiding roller, losing both traction power (due to the sliding of the rubber in contact with the straw that forms a mattress with the pulling roller), and with respect to the alignment of the rubber on the belt, inasmuch as the straw in contact with the rollers causes the rubber web to come out of alignment.

The use of a feed system on sugar-cane harvesters is also described in documents U.S. Pat. No. 8,240,115, U.S. Pat. No. 4,121,778, and U.S. Pat. No. 4,677,813.

In these documents, one discloses the use of a plurality of feed rollers driven by individual hydraulic engines, which generates a high weight for the assembly and a need for greater hydraulic power for the system to operate.

Due to the larger number of hydraulic components (engine, commands, hoses, connections), the system has a high initial cost and expansive maintenance, just because it requires special care and ostensive maintenance.

The pieces of equipment are also unsuitable for harvesting seedlings, because, since the system is heavy and the cane needs to be transferred from a set of rollers to another, the cane bud is easily damaged.

BRIEF SUMMARY

The present invention has the objective of providing a feed belt for a sugar-cane harvester that can be used for both harvesting cane intended for grinding and for harvesting seedlings for plantation, also providing a decrease in the total weight of the machine, less hydraulic power required for the feeding assembly, smaller number of hydraulic components and lower final cost of the machine, besides simplicity and lower maintenance cost.

The objectives of the present invention are achieved by means of a feed-belt for a sugar-cane harvester comprising first and second belts that are substantially overlapped and define a space for passage of whole cane between them, the first and second belts having a substantially curved profile.

One provides a system for adjusting spring pressure on the cane, which passes between the first and the second belts, the pressure adjustment system being associated to the second belt, overlapping the first belt. The position adjustment system is capable of adjusting the vertical and horizontal positions of the second belt with respect to the first belt, being located in the inlet and outlet regions of the belts. The pressure adjustment system comprises a set of springs and is aided by the position assembly that comprises a set of adjustment bars and rods capable of adjusting the pressure between the first belt and the second belt, vertically and horizontally, respectively.

The conveyor-belt of the invention also comprises transverse cleats of a metallic, plastic, polymeric or rubber material, which may have steel bore coated with a material of greater resilience such as plastic, polymer and rubber.

The first and second belts are driven by continuous chains that turn over sprockets situated at the belt ends, the first belt having a lifting rollers associated to it by chain. The lifting roller is associated to a sprocket of the first belt.

BRIEF DESCRIPTION OF THE FIGURES

The present invention will now be described in greater detail with reference to an example of embodiment represented in the drawings. The figures show.

DETAILED DESCRIPTION OF VARIOUS EMBODIMENTS

Figure 1:
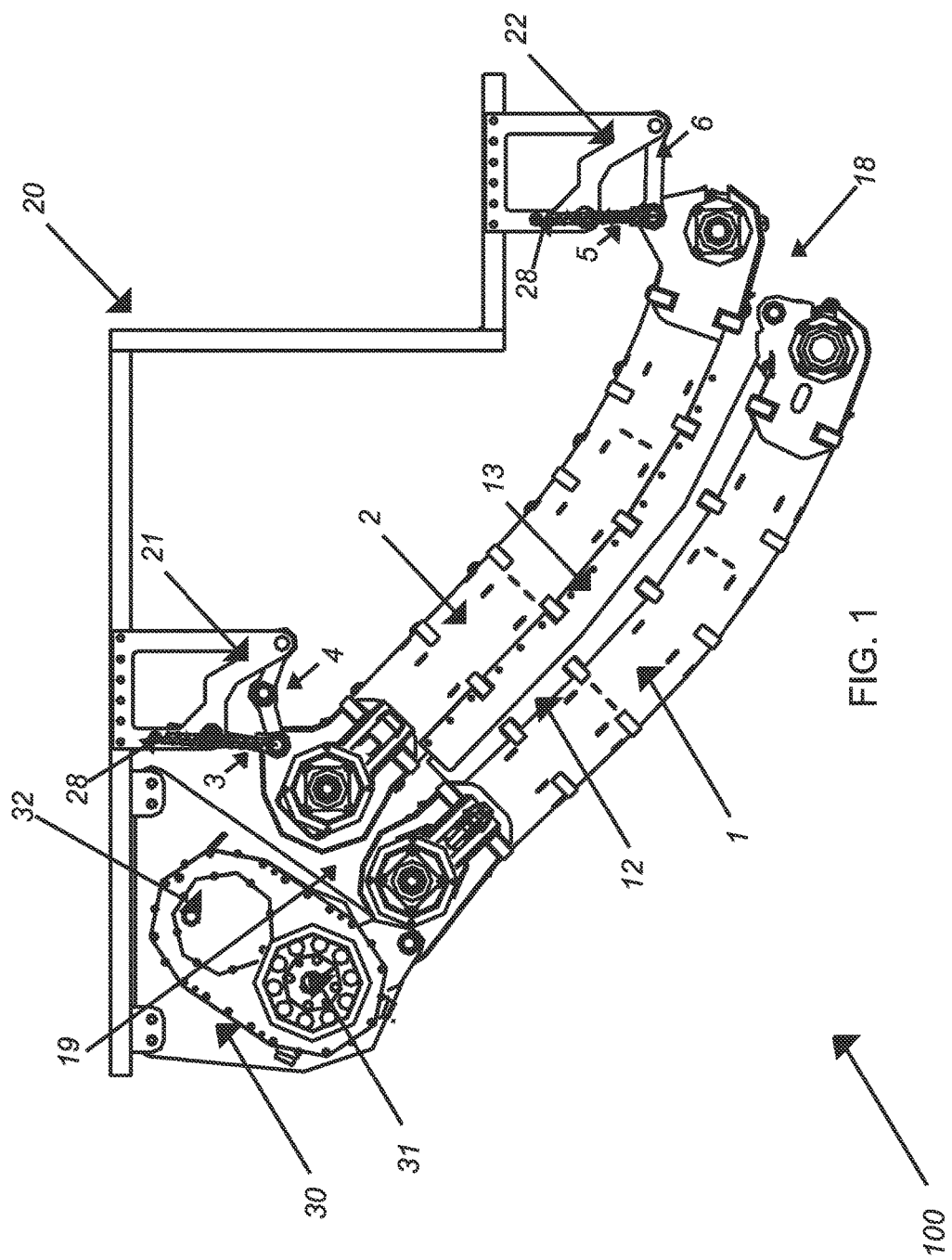
FIG. 1 is a side view of the double belt in the preferred embodiment of the present invention.

FIGS. 1 to 4 and 6 illustrate the feed-belt for use on a sugar-cane harvester according to a preferred embodiment of the invention.

As shown in the figures, the curved/grooved double belt 10 is composed by two belts 1, 2, arranged over each other, being driven by an individual hydraulic machine (not shown), which turns ion the necessary direction so that the region between the two belts 1, 2 will have the tangential velocity in the direction of feeding the cane into the harvester 50. As better shown in FIG. 2, the belts 1, 2 are actuated by means of the assembly formed by the two hydraulic engines, a pair of chains 10 and respective sprockets 9, on which the chains 10 turn.

In the harvesting process, the cane cut by the base-cutting edge 60 and caused to tumble by the tumbling roller (not shown) located at the front part of the harvester. The cane stalk that has just been cut is lifted by the lifting roller 40 and guided into the double-belt assembly 100. The lifting roller 40 may or may not be coupled to the lower roller of the lower belt 1.

At the cane inlet 18 into the double belt 100, the grooved/curved profile of the belt causes the cane to describe a turn angle/radius from its semivertical position to the feeding position (almost horizontal). The adjustment of relative position 25, 26, in both the vertical and the horizontal, of the upper belt 2 with respect to the lower belt 1 at the inlet 18, works in the sense of conforming automatically to the volume/density of the flow of whole cane that is getting into the feed assembly 100, as well as concomitantly with the set of springs 28, acting so as to guarantee sufficient pressure for trailing cane. When the volume is larger than that established in the initial/previous condition, the adjustment mechanism 26 is automatically moved means of the rod assembly 6, causing the opening at the inlet 18 to increase. The same system has contrary effect when the volume is smaller than that of the initial/previous condition.

Upon arriving at the inlet 18, the case will be pulled by the cleats/rollers 8, which may be made from metal, plastic or rubber, thus starting the trailing of the bundle of canes into the feed assembly of the double belt 100. Since the cleats 8 are linked to both side chains 10 on each of the belts 1, 2, the position in which the cleat 8 grabs the cane in the inlet region of the assembly will not be altered, and the cleats 8 will follow the grooved/curved profile of the belts 1, 2, determining the same path for the bundle of canes.

In order to guarantee that the bundle of canes will not come off the sides of the belts 1, 2, side protections 12, 13 are provided on the lower 1 and upper 2 belts, which overlap each other. In the same way, in order to guarantee that the cane will not fall out, either from above or from below, a perforated protection is provided in the form of a roof 11 on the upper belt 2 and a perforated protection in the form of a bottom 12 on the lower belt 1.

In the same way as at the inlet 18, when the cane arrives at the outlet region 19 of the double belt assembly 100, the mechanism that adjusts the position with respect to the outlet 25 conforms automatically in both vertical and horizontal directions, to create an area sufficient for passage of the bundle of canes that will then be chopped into billets at the chopping assembly 30.

The position adjustment system of the upper belt 2 is composed by two mechanisms, namely: the adjustment assembly 25 of the upper belt 2 at the outlet 19 and the adjustment assembly 26 of the lower belt 1 at the inlet 18. The adjustment assemblies 25 and 26 are integral with the frame 20, which in turn is integral with the chassis of the harvester 50.

The adjustment assembly 25 of the upper belt 2 at the outlet 19 comprises a bar 3 for vertical adjustment of the upper belt 2 at the outlet, the rod 4 for vertical/horizontal adjustment of the upper belt 2 at the outlet 19 and a fixation frame 21.

The adjustment assembly 26 of the upper belt 2 at the inlet 18 comprises a bar 5 for vertical adjustment of the upper belt 2 at the inlet, the rod 6 for vertical/horizontal adjustment of the upper belt 2 at the inlet 18 and a fixation frame 22.

The pre-adjustment of height/vertical distance of the upper belt 2 with respect to the lower belt 1 is given by the adjustment of the height adjusting bars 3, 5, which also determine one of the positions of movement of the rods 4, 6.

With the start of the harvesting operation, the flow of cane, upon arriving at the inlet region 18, will be pulled by the cleats/roller 8. If the volume is different (either larger or smaller) than that pre-stipulated by the adjustment of height with respect to the belts 1, 2, the adjustment rod at the inlet 18 will move in a path close to a radius, adjusting horizontally and vertically, and conforming automatically so as to have an opening sufficient for the flow of cane.

Figure 2:
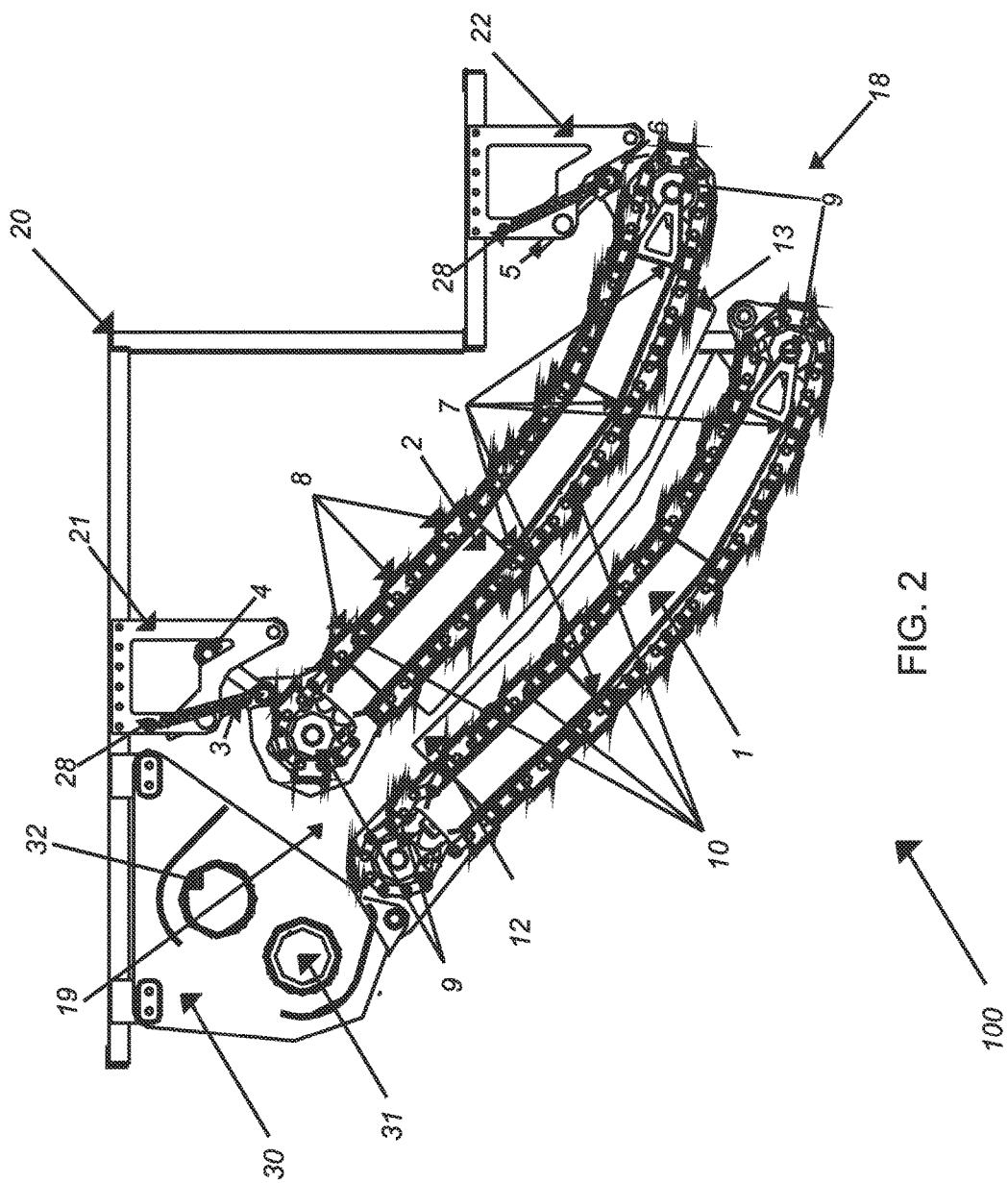
FIG. 2 is a cross-sectional side view of the double belt in the preferred embodiment of the present invention.
Figure 3:
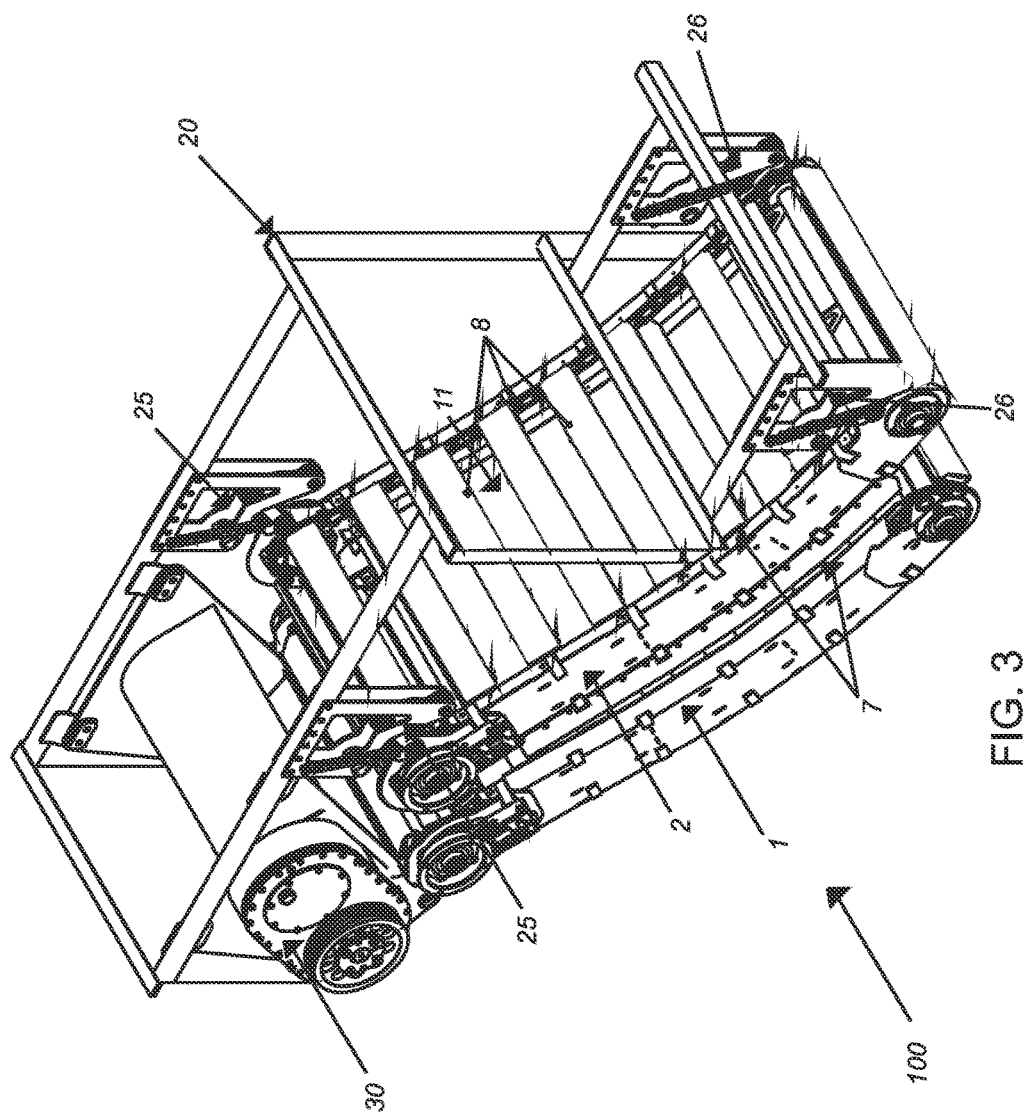
FIG. 3 is an isometric view of the double belt in the preferred embodiment of the present invention.
Figure 4:
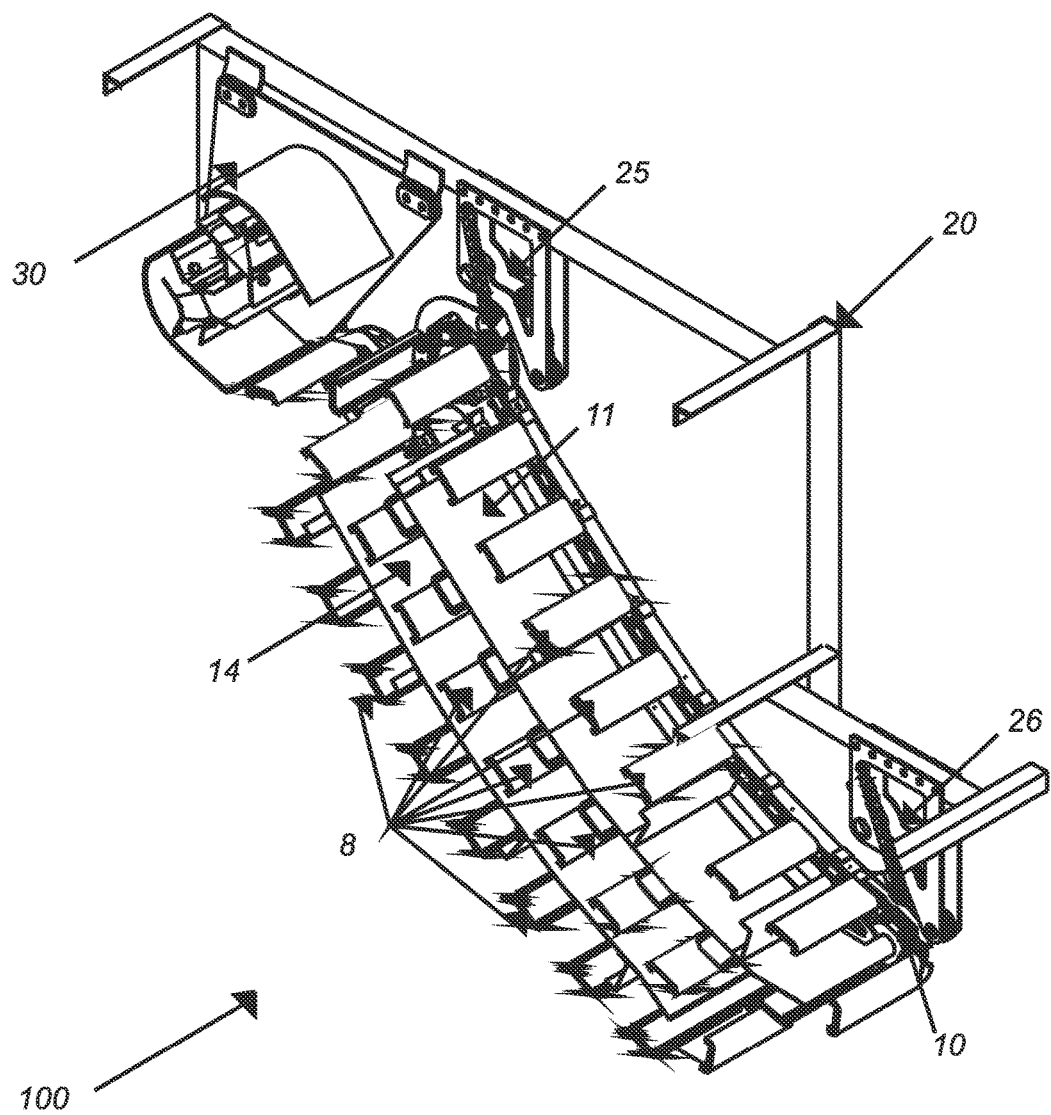
FIG. 4 is a cross-sectional isometric view of the double belt in the preferred embodiment of the present invention.

Right after the rod 6 of the inlet 18 begins to move, the rod 4 of the outlet 19 will also begin to move, so that, along the path of the cane in the region between the belts 1, 2 there will be adequate capability of conducting the flow of cane. At the outlet 18 of the cane, the outlet rod 4 moves/adjusts to guarantee pressure (together with the spring assembly 28) and sufficient flow of cane to be chopped at the chopping assembly 30, which includes the lower rollers 31 and the upper rolls 32 of the chopper, as best shown in FIGS. 1 to 3.

The conveyor belt 100 of the invention has a number of advantages with respect to the prior art, which are presented hereinafter.

The curved/grooved shape of the profile of the belts 100, both lower 1 and upper 2, has the objective of improving/facilitating the entry and transport of the whole cane ion the vertical space limited between the lower belt 1 and the upper belt 2, seeking to minimize the consumption of energy to cause the cane to enter the assembly. The cane describes a larger angle/radius at the inlet 18 with a long distance provided by the curved/grooved profile of the belt 100, facilitating the feeding process.

Since the belts 100 are provided with chains 10 at both sides, which are interconnected by the cleats 8, when the set of cleats 8 of the lower and upper belts 1, 2 catches/pulls the cane at one of its portions (segments), this position is no longer altered, if the linear velocities are equal. In the case of the belts 1, 2 with different linear velocities to harvest species of cane having more straw for the purpose of grinding, the advantage is observed in the slight friction caused by the difference in velocity to aid in removing the straw.

The double belt 100 may comprise both metallic and plastic cleats, as well as metallic rollers and/or rollers covered with rubber/plastic (polyurethane), preferably cleats 8 and metallic rollers 8 used in the case of transporting billets in the grinding condition and the cleats 8 and the plastic/rubbered rollers 8 used for transport in the gemma (seedlings) condition. In the preferred embodiment, one uses a steel cleat covered with a material of greater resilience, and this cleat could be used for both final application of the cane for grinding, and for plantation, guaranteeing top performance for the harvesting, without the need for maintenance (change of cleat to one condition or another). Another advantage of the preferred embodiment is due to the fact that the cleat has a broader and reversible profile, wherein the broader cleat will favor the discharge of stress on the (broader) surface of the cover material (PU, rubber, plastic, polymer) and prolong the life thereof.

Figure 5:
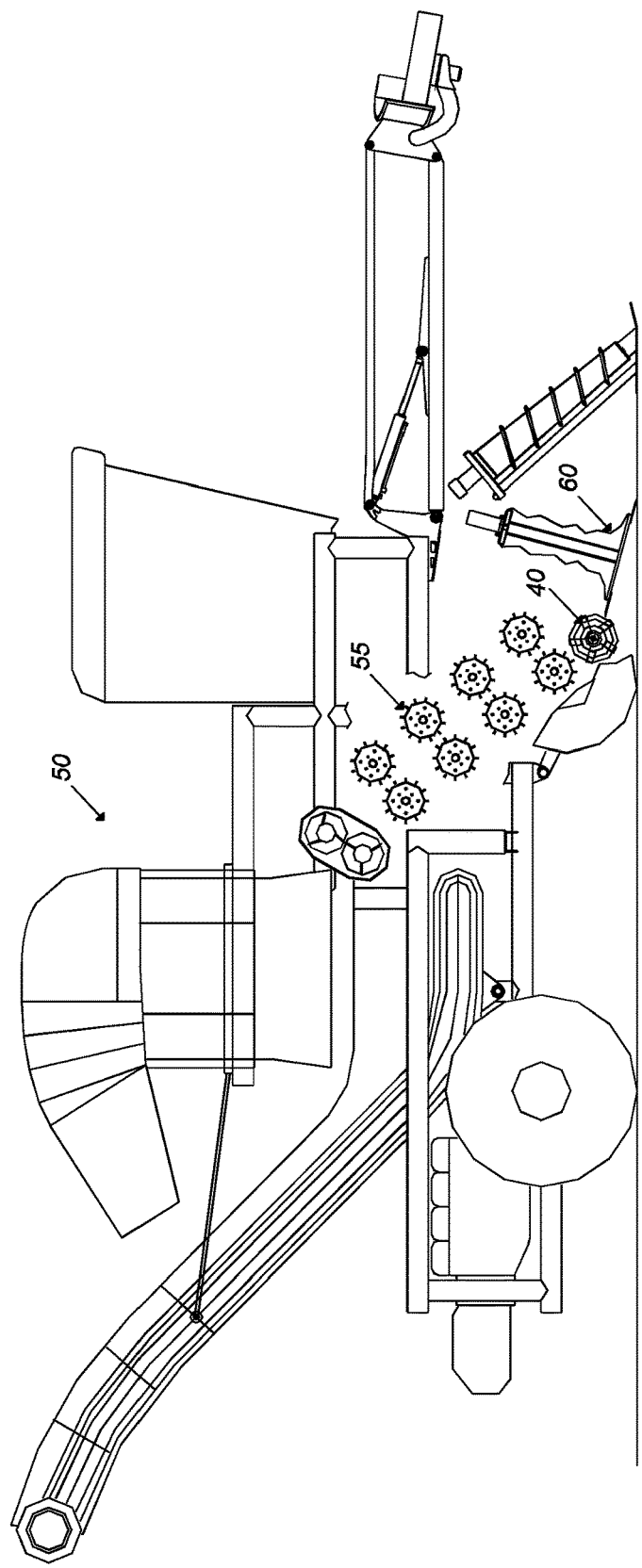
FIG. 5 is a side view of a sugar-cane harvester of the prior art, provided with a feed assembly using rollers.
Figure 6:
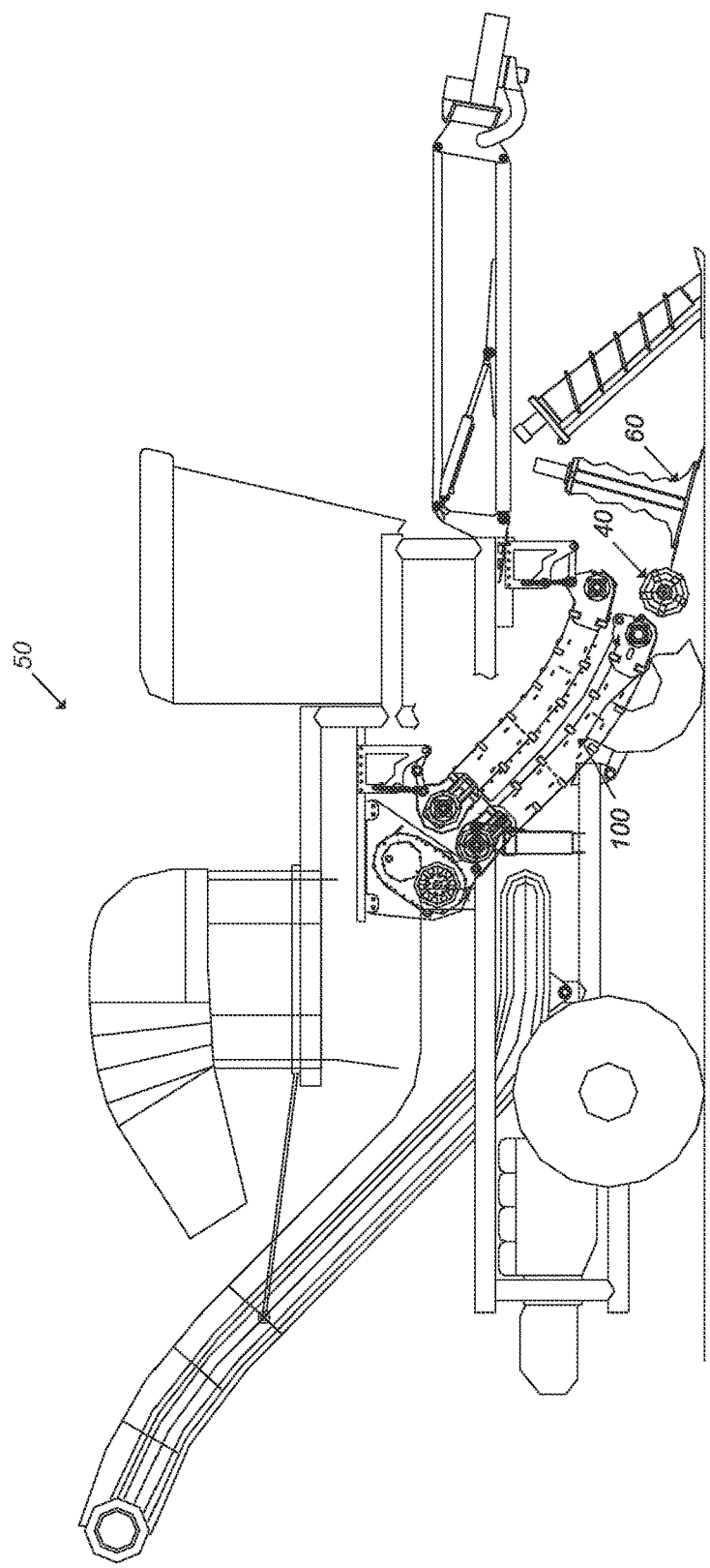
FIG. 6 is a side view of a sugar-cane harvester as shown in FIG. 5, using, as a feed assembly, the double belt of the present invention in its preferred embodiment.

The use of the double belt 100 enables the use of only two hydraulic engines (not shown) for actuating the assembly (reduction of weight), against a number of prior-art engines (one for each roller 55, as schematically illustrated in FIG. 5).

The lower belt 1 is integral with the chassis of the harvester 50, and the upper belt 2 comprises the automatic adjustment of pressure by means of the springs 28 of vertical position and horizontal positioning on the cane 25, 26, which is enabled by the articulation assembly 3, 4, 5,6, thus always guaranteeing the better condition for feeding the cane as a function of the volume/density of the cane that enters into the assembly.

One may couple the sprocket 9 of the guide roller of the lower belt to the lifting roller 40 by means of chains (not shown in the preferred embodiment of the present invention), and thereby manage to reduce the hydraulic engine that would be used to drive the lifting roller 40, thus generating greater saving in hydraulic components and reduction in the required hydraulic power.

In short, the present invention provides decrease in the total weight of the machine, lower hydraulic power required for the feed assembly, smaller number of hydraulic components in the assembly, lower final cost of the machine, since structural elements are used instead of hydraulic ones, which are more expensive, and easier and cheaper maintenance, since there will be only two actuation hydraulic engines that are easily removable, and the other items are structural elements. Further, the proposed double feed belt assembly 100 is suitable for both cane for the purpose of grinding condition and harvesting seedlings, since it does not damage the cane gemma, when cleats/rubbered rollers of plastic or any other material having greater resilience are used on the belt.

A preferred example of embodiment having been described, one should understand that the scope of the present invention embraces other possible variations, being limited only by the contents of the accompanying claims, which include the possible equivalents.

The invention claimed is:

1. A feed-belt (100) for a sugar-cane harvester, said feed-belt (100) comprising:
    a first belt (1) extending between a first end adjacent an inlet region (18) and a second end adjacent an outlet region (19) of the feed-belt (100);
    a second belt (2) extending between a first end adjacent the inlet region (18) and a second end adjacent the outlet region (19) of the feed-belt (100), the second belt (2) and the first belt (1) each exhibiting a curved profile between their respective first and second ends adjacent the inlet and outlet regions (18, 19), respectively;
    a first adjustment assembly (26) comprising a first bar (5), a first rod (6), and a fixation frame (22), the fixation frame (22) being operatively attached to a frame (22), the first bar (5), and the first rod (6), the first bar (5) and the first rod (6) also being operatively attached to the first end of the second belt (2) adjacent the inlet region (18); and
    a second adjustment assembly (25) comprising a second bar (3), a second rod (4), and a fixation frame (21), the fixation frame (21) being operatively attached to the frame (22), the second bar (3), and the second rod (4), the second bar (3) and the second rod (4) also being operatively attached to the second end of the second belt (2) adjacent the outlet region (19);
    wherein:
    the first and second belts (1, 2) substantially overlap each other and define a space for passage of cut cane between the first and second belts (1, 2);
    a vertical adjustment of a position of the first and second ends of the second belt (2) relative to the first belt (1) and thus a vertical adjustment of a distance between the second belt (2) and the first belt (1) is provided via the operative attachment of the first and second bars (3, 5) to the first and second ends of the second belt (2); and
    a horizontal adjustment of the first and second ends of the second belt (2) is provided via the operative attachment of the first and second rods (4, 6) to the first and second ends of the second belt (2).

2. The feed-belt according to claim 1, wherein a vertical adjustment of the first and second ends of the second belt (2) is also provided via the operative attachment of the first and second rods (4, 6) to the first and second ends of the second belt (2).

3. The feed-belt according to claim 1, wherein:
    the first belt (1) is operatively attached to the frame (20) at the second end of the first belt (1) via a chopping assembly (30) integral to the frame (20);
    the second belt (2) is operatively attached to the frame (20) at the first end of the second belt via the fixation frame (22); and
    the second belt (2) is operatively attached to the frame (20) at the second end of the second belt via the fixation frame (21).

4. The feed-belt according to claim 1, wherein the first and second rods (4, 6) are configured to automatically adjust the space for passage of the cut cane between the first and second belts (1, 2), so as to conform the space to a volume of the cut cane flowing between the first and second belts (1, 2).

5. The feed-belt according to claim 1, further comprising side protectors (12, 13) mounted on the first and second belts (1, 2), respectively, the side protectors (12, 13) being configured to prevent the cut cane flowing between the first and second belts (1, 2) from coming off sides of the first and second belts between the inlet and outlet regions (18, 19).

6. The feed-belt according to claim 1, wherein the curved profile of each of the first and second belts (1, 2) is continuously curved between the respective first and second ends of the first and second belts (1, 2).

7. The feed-belt according to claim 1, further comprising a pair of springs (28), one spring (28) being operatively attached to the fixation frame (22) and the first rod (6), the other spring (28) being operatively attached to the fixation frame (21) and the second rod (4), the pair of springs (28) being configured for adjusting a pressure on the cut cane passing between the first and second belts (1, 2).

8. The feed-belt according to claim 7, wherein the pair of springs (28) for adjusting the pressure are further configured for, together with the first and second rods (4, 6), adjusting a vertical position and a horizontal position of the second belt (2) with respect to the first belt (1).

9. The feed-belt according to claim 1, further comprising transverse cleats (8).

10. The feed-belt according to claim 9, wherein said transverse cleats (8) are made of at least one of a metallic material, a plastic material, a polymeric material, or a rubber material.

11. The feed-belt according to claim 9, wherein said transverse cleats (8) are provided with a steel bore coated with a material of greater resilience.

12. The feed-belt according to claim 11, wherein said material coating said steel bore is at least one of a plastic material, a polymer material, or a rubber material.

\* \* \* \* \*